June 29, 1948.   J. W. BAKER, JR   2,444,086
TOW BAR
Filed Jan. 23, 1946
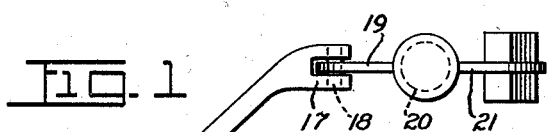
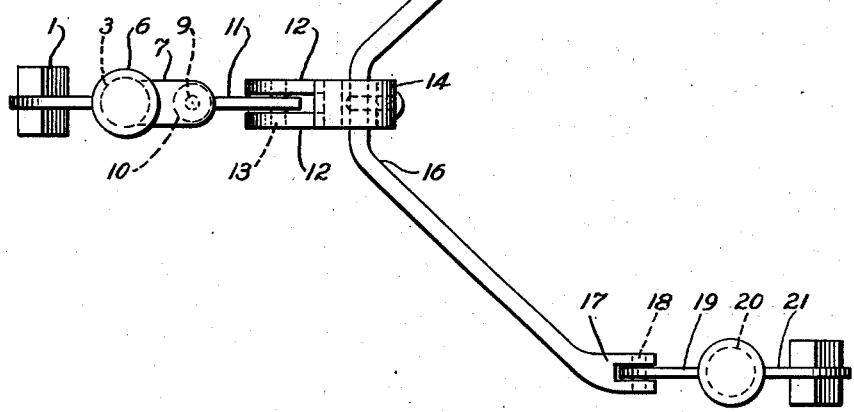
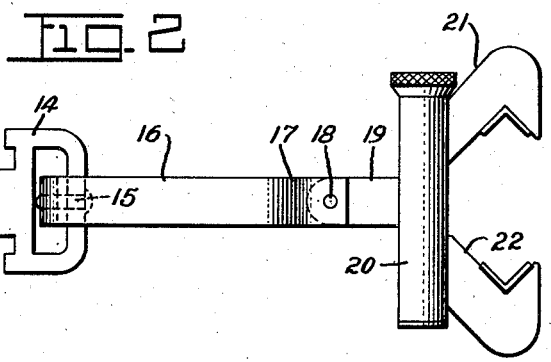
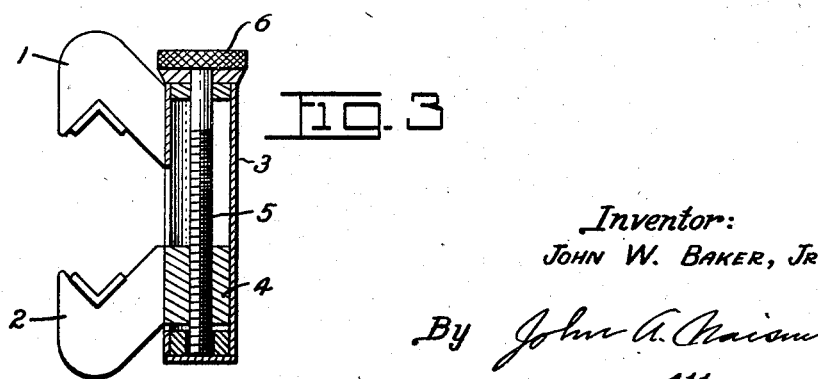
Inventor:
JOHN W. BAKER, JR.
By John A. Chaismith
Attorney.

Patented June 29, 1948

2,444,086

UNITED STATES PATENT OFFICE 2,444,086

TOW BAR

John W. Baker, Jr., San Jose, Calif.

Application January 23, 1946, Serial No. 642,865

1 Claim. (Cl. 280—33.14)

The present invention relates to tow bars of the type that are clamped to the opposed front and rear bumper bars of automobiles for towing purposes.

It is an object of my invention to provide a towing bar structure of the character indicated that may be quickly and easily clamped upon, or removed from, the opposing bumpers of towing and towed automobiles, and that will hold the towed vehicle in proper relation to the towing vehicle at all times when in use and is so organized and constructed that it compensates for variation caused by unevenness of roadways, turning movement of the towing vehicle, or contact of the vehicle wheels with raised obstacles or other irregularities; and also one that permits the backward as well as the forward manipulation of the towed car.

It is also an object to provide a tow bar structure so constructed and arranged that it can be readily stored in the luggage compartment of the average car, that is it will be compact and simple in construction, light in weight, amply strong for the purpose for which it is designed, durable and highly efficient in its practical application.

In the drawing:

Figure 1 is a top plan view of a tow bar embodying my invention.

Figure 2 is a side elevation of the same.

Figure 3 is an enlarged longitudinal sectional view through one of the clamping means.

It should be understood, of course, that while I have shown and described but one specific embodiment of my invention, changes and modifications may be made within the scope of the appended claims without departing from the spirit of the invention.

Referring now more particularly to the drawing, I show at 1 and 2 the opposing jaws of a grapple, the one jaw 1 being fixedly mounted on a hollow cylinder 3 as shown and the other jaw 2 being mounted on a follower block 4 which engages a threaded rod 5 fitted with a knurled knob 6 and is advanced or retracted as desired by turning the knob 6.

On the side of cylinder 3 opposite to the jaw 1 are spaced parallel lugs 7 and 8 supporting integrally a vertical stub shaft 9 on which is journaled a sleeve 10 having a longitudinally disposed ear 11 projecting therefrom.

At 12—12 are a pair of lugs pivotally connected to ear 11 at 13 and terminating at one end in a D shaped member 14 which therefore is enabled to swing in a vertical plane.

Passing through the D shaped member and loosely bolted thereto at 15 is a draft member 16 extending angularly from the D shaped member and terminating in slotted ends as at 17. Each slotted end 17 has a pin 18 passing therethrough to pivotally support an ear 19 which in turn is integral with a hollow cylinder 20. Each cylinder 20 is provided with a fixed jaw 21 and a movable jaw 22 in the same manner as cylinder 3 heretofore described, and forming grapples for applying to the front bumper of the towed car.

By turning the knurled knob at the top of each cylinder the lower jaw is moved downwardly, and by turning it in the opposite direction the jaw is moved upwardly, permitting the front single grapple to be clamped on the rear bumper of the towing car and the two rear grapples to be clamped upon the front bumper of the towed car. When this simple operation is completed the towed car is forced to travel in the path of the towing car. The two rear grapples effectually prevent the towed car from being jerked laterally by any suddenly encountered obstacle, and the several joints at 10, 13, 14 and 17 permit either car to move upwardly, downwardly or angularly relative to the draft line of the other car.

I claim:

A tow bar for cars comprising a pair of rear grapples operative to apply to the front bumper of a towed car, a grapple operative to apply to the rear bumper of the towing car, and connecting means between the front and rear grapples comprising, a pair of lugs projecting horizontally and rearwardly from the front grapple and supporting a vertical stub shaft, a sleeve rotationally mounted on said stub shaft, and having a vertically disposed ear projecting therefrom, a D shaped member having a pair of parallel lugs projecting therefrom and pivotally connected to said ear, a draft member passing through and loosely bolted to said D member and extending angularly therefrom and terminating in vertically slotted ends, each slotted end having pivotal connection with an ear projecting vertically from each rear grapple.

JOHN W. BAKER, Jr.

REFERENCES CITED

The following references are of record in the file of this patent:

UNITED STATES PATENTS

| Number | Name | Date |
|---|---|---|
| 1,435,063 | Holmes | Nov. 7, 1933 |
| 2,243,347 | Klein et al. | May 27, 1941 |
| 2,268,181 | Bolton | Dec. 30, 1941 |